No. 712,903. Patented Nov. 4, 1902.
E. E. BULL.
HAME FASTENER.
(Application filed Sept. 11, 1901.)
(No Model.)
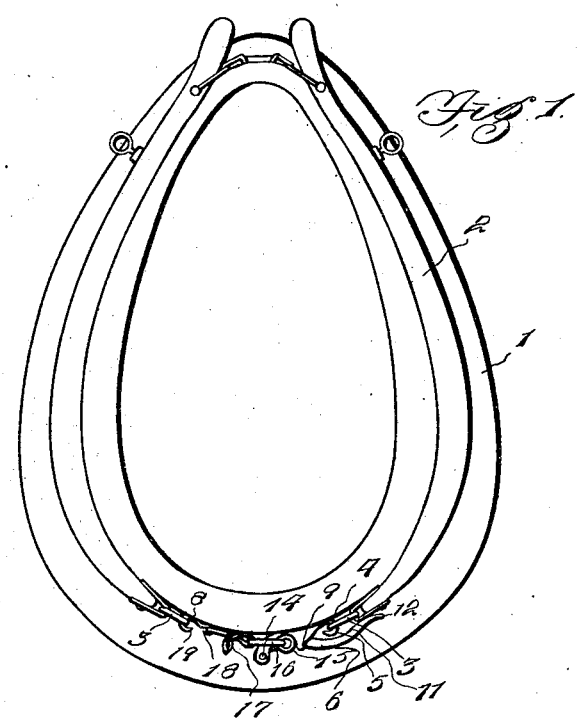
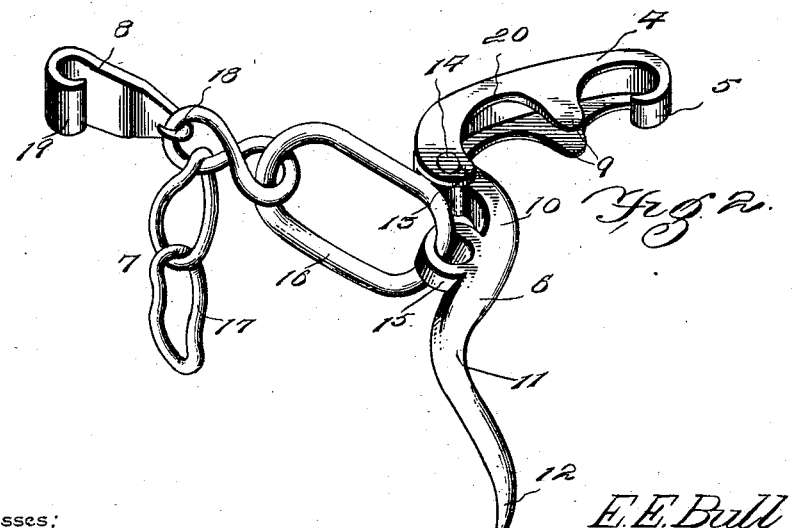
Witnesses:
O. M. Simpson
R. M. Elliott.
E. E. Bull, Inventor:
by C. A. Snow & Co.
Attorneys.

United States Patent Office.

EDWARD EVERETT BULL, OF WHITWELL, TENNESSEE.

HAME-FASTENER.

SPECIFICATION forming part of Letters Patent No. 712,903, dated November 4, 1902.

Application filed September 11, 1901. Serial No. 75,062. (No model.)

*To all whom it may concern:*

Be it known that I, EDWARD EVERETT BULL, a citizen of the United States, residing at Whitwell, in the county of Marion and State of Tennessee, have invented a new and useful Hame-Fastener, of which the following is a specification.

This invention relates to hame-fasteners.

The object of the invention is to provide simple and effective means for connecting the lower ends of the hames and in a positive manner to prevent accidental separation thereof and to construct the fastener in such manner that it may be readily and easily operated to release the hames when desired, whereby adjustment may be quickly obtained to compensate for variations in the sizes of collars and to change the degree of binding stress of the hames on the collar.

With these and other objects in view, as will appear as the nature of the invention is better understood, the same consists in the novel construction and combination of parts of a hame-fastener, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the scope of the invention, and in these drawings—

Figure 1 is a view in elevation exhibiting a collar and hames with the improved hame-fastener associated with the hames. Fig. 2 is a perspective detail view of the fastener detached from the hames.

Referring to the drawings, 1 designates a collar, and 2 a pair of hames provided at their lower extremities with the usual loops 3. As these parts may be of any ordinary or preferred construction and as they form no part of the present invention, detailed description thereof is deemed unnecessary.

The hame-fastener comprises a clip 4, provided at one extremity with a hook 5 to engage one of the hame-loops 3, a setting or tightening lever 6, pivotally associated with the opposite extremity of the clip, a series of links (designated generally by the numeral 7) connected with the lever, and a double-hook plate 8, adapted to engage, respectively, with the other loop of the hame and with one of the series of links 7. The clip is a hollow structure made either of cast metal or drop-forged to the appropriate shape and is provided intermediate of its ends with two inward curved or deflected projections 9, constituting spring locking-jaws, to embrace the setting-lever and hold the same associated with the clip when in the position shown in Fig. 1, thereby positively preventing accidental separation or disconnection of the lever from the clip when adjusted. The back of the clip is curved, as is also one terminal portion of the lever, as at 10, thereby to permit the lever snugly to fit within the clip when in locked position, the other terminal portion of the lever being incurved, as at 11, to fit over the hook 5 and outturned at its extremity, as at 12, to permit the lever being readily grasped by the fingers when it is to be unlocked. By thus constructing the lever and the clip the lever is caused to lie flat upon the clip and upon one member of the hames, thereby obviating the presentation of an obstruction which might be struck by an object, and thus unlock the lever. That portion of the clip to which the setting-lever is pivoted is provided with two ears 13, one only being shown, orificed for the reception of a pin 14, for holding the setting-lever associated therewith, these ears projecting a sufficient distance beyond the back of the clip as to throw the draft on the lever back of the pin 14, so that in use there will be no danger of the lever being unlocked from the strain applied thereto from the hames when the same are locked. The outer side of the lever is provided with a transversely-orificed ear 15, which is engaged by a plain link 16, which latter, when the lever is in locked position, straddles the ears 13, as clearly shown in Fig. 1. Connecting with the link 16 are a plurality of twist-links 17, adapted to engage with one of the hooks 18 of the hook-plate 8, the other hook 19 of which is adapted to engage with the loop 3 of the hame.

In operating the device the hooks 5 and 19 of the clip 4 and hook-plate 8, respectively, are hooked into engagement with the loops 3 of the hames, it being understood that the setting-lever is turned outward to the position shown in Fig. 2. The appropriate twist-link 17 of the series is now hooked into engagement with the hook 18 of the hook-plate, care being taken to employ the links 17 that will draw the hames as tightly together as possible. The setting-lever is then turned upward, thereby drawing the hames tightly against the collar, the lever being passed between the locking-jaws 9, with the loop 16 resting in the cut-away portions 20 of the clip. When the lever is thus locked, it will, as before pointed out, be securely held in place against the clip by the locking-jaws 9. Should it be desired to detach the hames from the collar, it will only be necessary to throw the setting-lever to the position shown in Fig. 2 and release the twisted link from engagement with the hook 18 of the hook-plate 8, when the hames may be removed. When adjusting the hames to collars of different sizes, it will only be necessary to select the proper link of the series 17 to effect desired fitting.

The device as a whole is by preference made of steel or of malleable iron and may be readily applied to the forms of hames now in use without necessitating any change in their structural arrangement.

In use the device is thoroughly safe, presenting a deadlock when fastened, and being impossible of accidental unfastening in use.

Having thus fully described the invention, what I claim as new, and desire to secure by Letters Patent, is—

A hame-fastener comprising a clip provided at one end with hame-engaging means, and at its other end with orificed ears, a setting-lever pivoted between the said ears and provided with an orificed offset, flexible hame-engaging means carried by the offset, and spring locking-jaws integral with the clip intermediate of its ends to embrace and hold the setting-lever in locked adjustment.

In testimony that I claim the foregoing as my own I have hereto affixed my signature in the presence of two witnesses.

EDWARD EVERETT BULL.

Witnesses:
WILLIAM MCCURRY,
WILLIAM CROSS.